Figure 4:
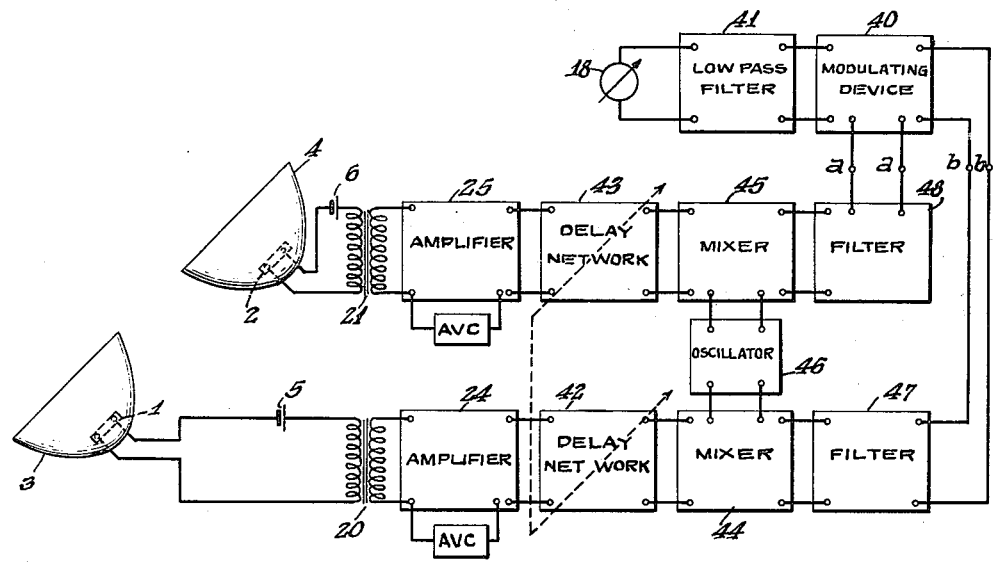

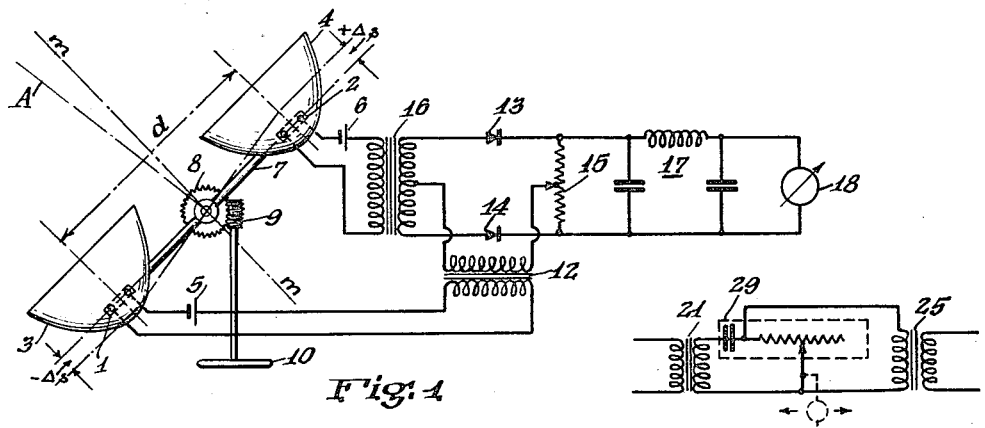
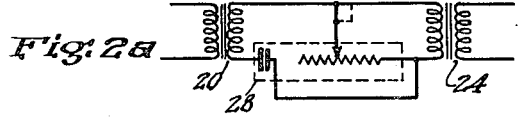
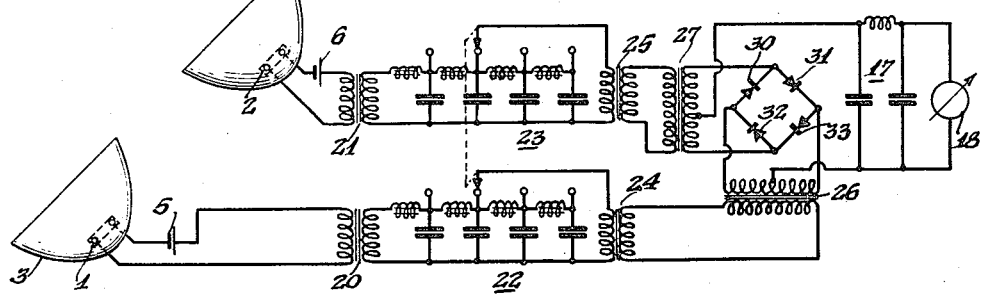
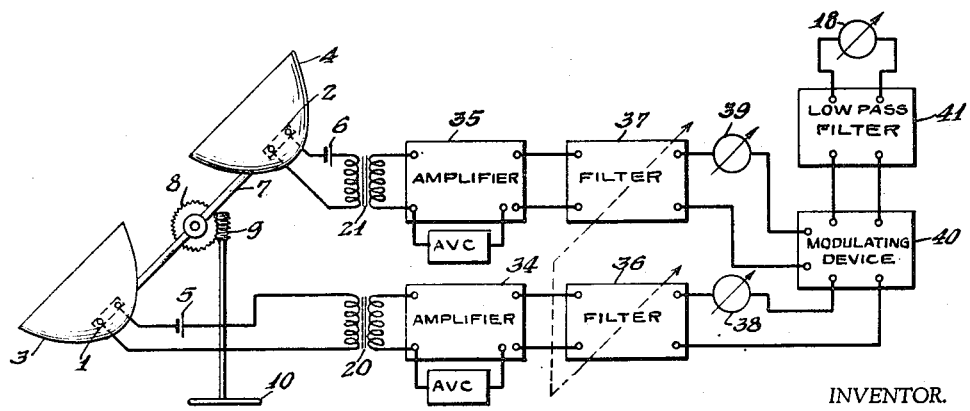

July 25, 1939.    G. GUANELLA    2,166,991
DIRECTION FINDING SYSTEM
Filed Nov. 24, 1937    6 Sheets-Sheet 3

INVENTOR.
Gustave Guanella
BY
ATTORNEY.

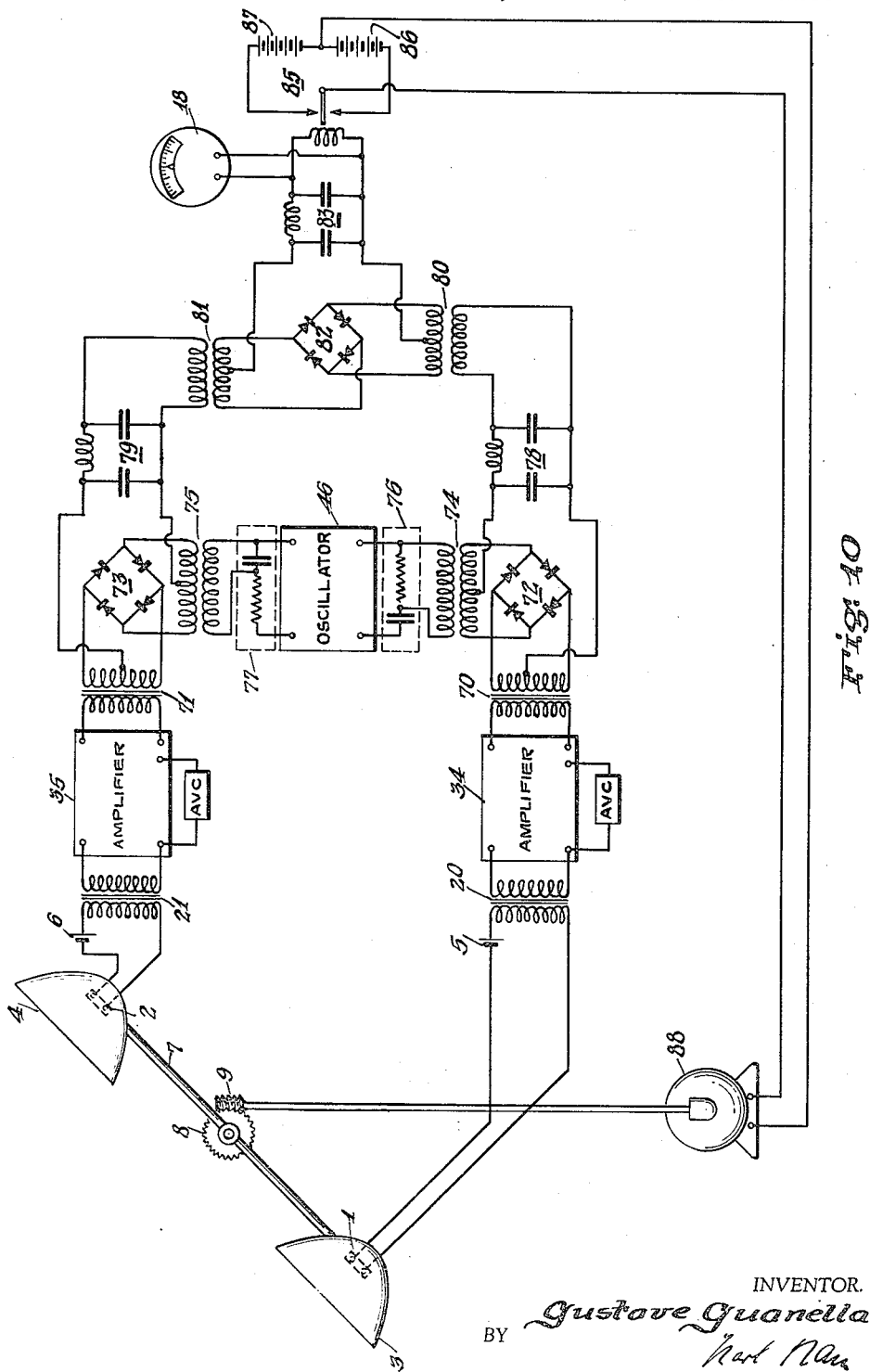

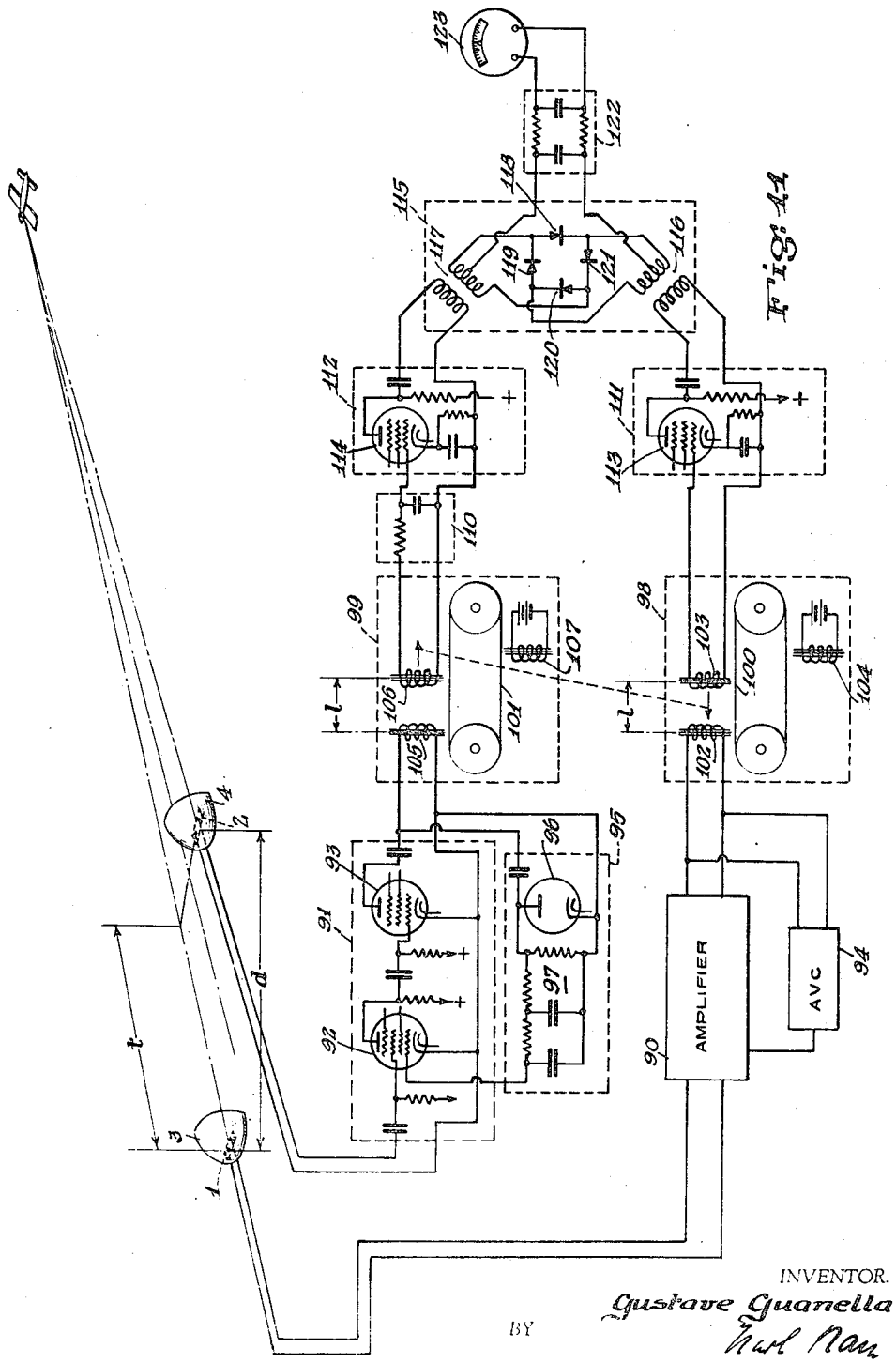

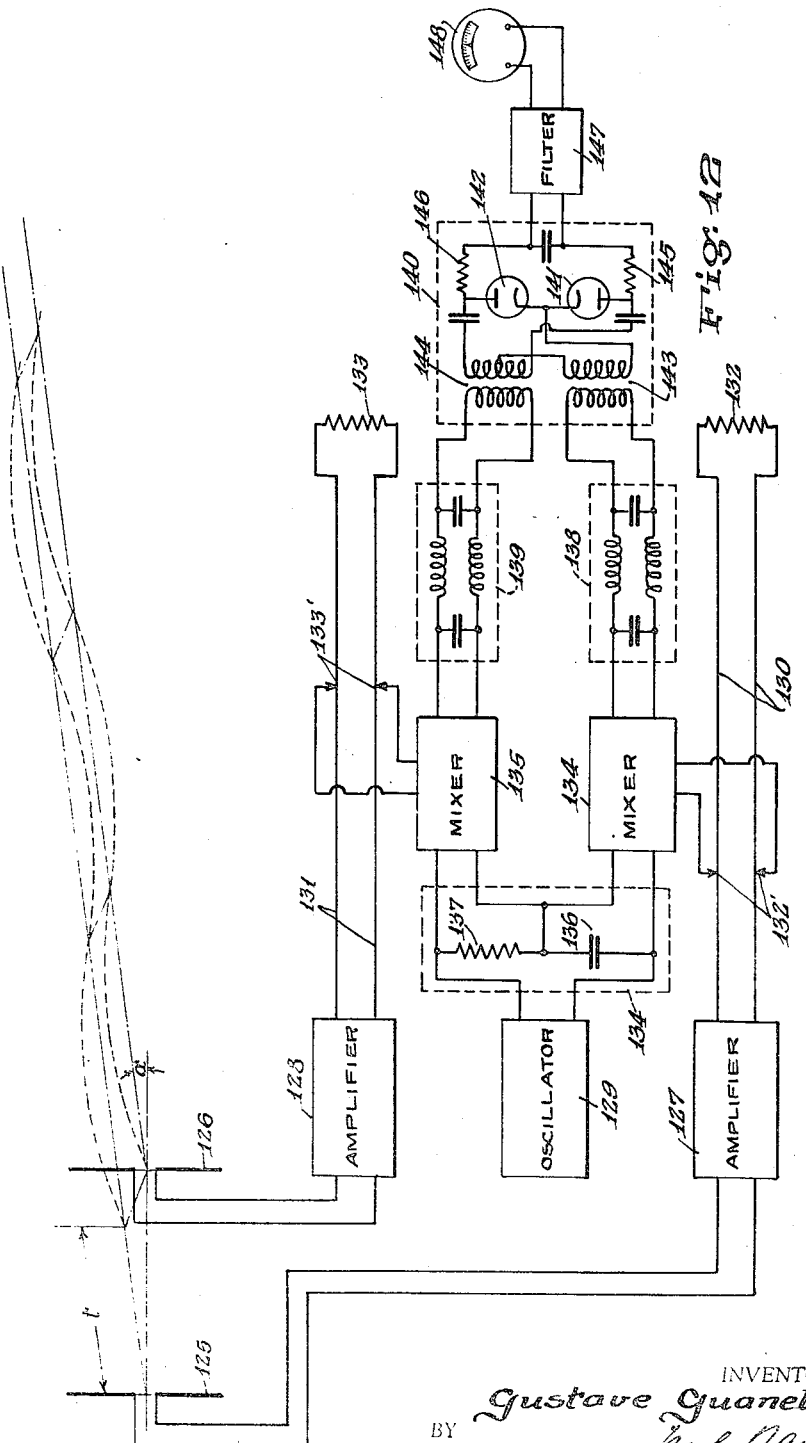

Patented July 25, 1939

2,166,991

UNITED STATES PATENT OFFICE 2,166,991

DIRECTION FINDING SYSTEM

Gustave Guanella, Zurich, Switzerland, assignor to Radio Patents Corporation, New York, N. Y., a corporation of New York Application November 24, 1937, Serial No. 176,207
In Switzerland December 1, 1936

15 Claims. (Cl. 250—11)

My invention relates to a system for and method of determining the direction of arrival of radiant energy, more particularly to a bearing indicator for sound waves although not limited thereto.

It has already become known in order to determine the incoming direction of sound waves to receive the sound or noises whose bearing is to be determined at two separate points by means of suitable pick-up devices or absorbers sufficiently spaced from each other, and to compare the received sound signals in a common receiver or indicating device. In carrying out this method the sound pick-up devices may be either rotated mechanically by the aid of a suitable mechanism or they may be arranged fixedly and the sound or noise received variably retarded by means of acoustic or electric delay devices. In both cases the received and/or delayed sound or noise signals are brought to coincidence by continuous comparison in the receiver or indicating device.

The two common methods based on this general principle are known as the directional binaural hearing method and the interference or compensation method. According to the binaural method, the sounds or noises received by the spaced pick-up devices or absorbers are transmitted through suitable acoustic transmitting paths of variable length such as rubber tubes or the like to a pair of acoustic receivers or telephone ear pieces applied to the ears of the operator. At least one of the rubber tubes or other acoustic transmitting paths is adjustable for controlling the amount of retardation of the sounds or noises impinged upon the ears of the operator. If an incoming sound wave is in a direction at right angle to the line connecting the absorbers (medial line or plane) the operator receives an impression of the sound or noise arriving exactly in the medial plane between the absorbers provided the length of the acoustic coupling paths, that is in the example mentioned the length of the rubber tubes connecting the receivers with the ear pieces or the like are equal. If the direction of incidence of the sound waves or noise forms an angle with the connecting line of the absorbers other than 90°, the operator receives an impression that the source of the sound or noise is either to the right or the left. By varying the length of the acoustic path leading to one or both receivers such as by adjusting the length of either or both of the rubber tubes, the impression that the sound arriving in the medial plane is restored, whereby the required change of length of the acoustic path is a measure of the deviation of the direction of incidence from the medial plane between the sound absorbers.

According to the interference or compensation method, the sounds or noises received by two spaced pick-up devices or absorbers are converted into corresponding electrical current variations or potentials by means of suitable pick-ups or microphone receivers and the currents superimposed to form a resultant current or potential serving to operate an electric indicating device or telephone receiver. If the sound or noise currents are in phase, that is if the incoming sound or noise arrives in a direction coincident with the medial plane between the absorbers, the volume of the sound in the receiver or the deflection of the indicator will be a maximum. If on the other hand, the sound currents received by the absorbers are of different phase, that is, if the sound waves arrive in a direction forming an angle with the medial plane between the absorbers, the volume in the receiver or the deflection in the indicator will be diminished. In this manner, by either mechanically rotating the sound pick-up or absorbing devices or by variably acoustically or electrically retarding either or both of the sound currents or potentials until obtaining a maximum volume in the receiver or maximum deflection of the indicator, the direction of arrival of the sounds or noises may be determined in a manner similar to the subjective determination according to the binaural receiving method.

Experience has shown that both of the above methods possess disadvantages of various characters. The binaural receiving method requires a trained operator involving the disadvantages and drawbacks due to the human element. Moreover, the determination of the direction may be greatly influenced by disturbing noises of various origins. Similarly, such disturbing noises may have the effect of flattening the maximum indication obtained according to the interference method resulting in decreased accuracy and reliability of the bearing indications. A further disadvantage is the fact that bearing errors or erroneous indications may be obtained due to secondary maxima and minima obtained with both methods.

It is an object of the present invention to overcome the disadvantages and drawbacks inherent in the previous methods of direction finding using sound waves or other radiant energy and to provide a novel method and system for direction finding which is both simple in construction and highly efficient and reliable in operation compared with the methods known in the prior art.

A more specific object is to eliminate errors due to the human element and to prevent false bearing indications and erroneous results caused by interfering noises or other undesirable sound sources.

Another object is the provision of a sound direction indicator which is adapted to operate fully automatically, that is without requiring a searching operation or manipulation on the part of the operator.

A further object of the invention is the provision of a sound wave direction finding method and system adapted for direct calibration in directions or angles of deviation from a fixed reference line or direction.

A further object is the provision of a novel method for direction finding by means of sound waves wherein the effect of disturbing noises is greatly minimized or substantially eliminated by mutual compensation in the receiver.

Another object of the invention is the provision of a radio direction finding system using spaced antenna elements.

Another object is the provision of a direction finding system for sound waves employing spaced absorbers and a novel means for variably delaying the sound signals in either or both receiving channels for comparison in a common indicator or other translating device for determining the direction of incidence of the sounds received.

Figure 5:
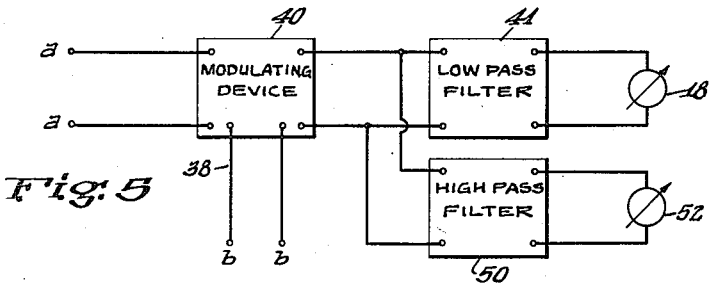
Figure 6:
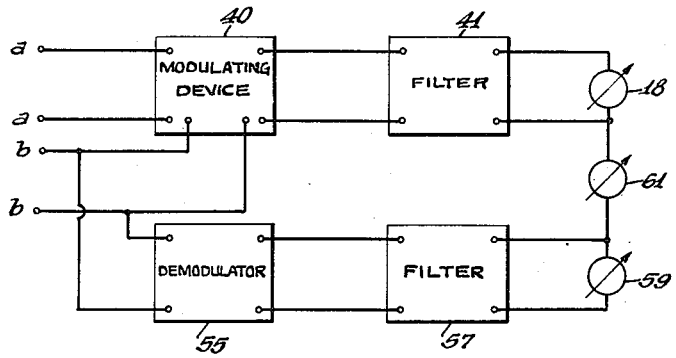
Figure 7:
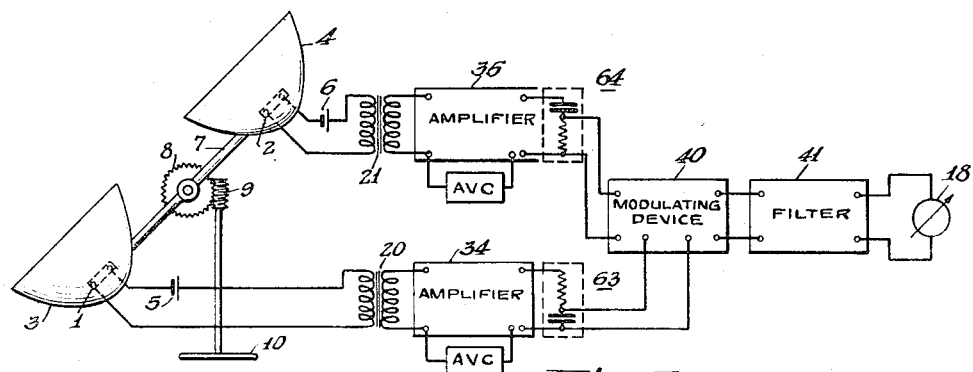
Figure 8:
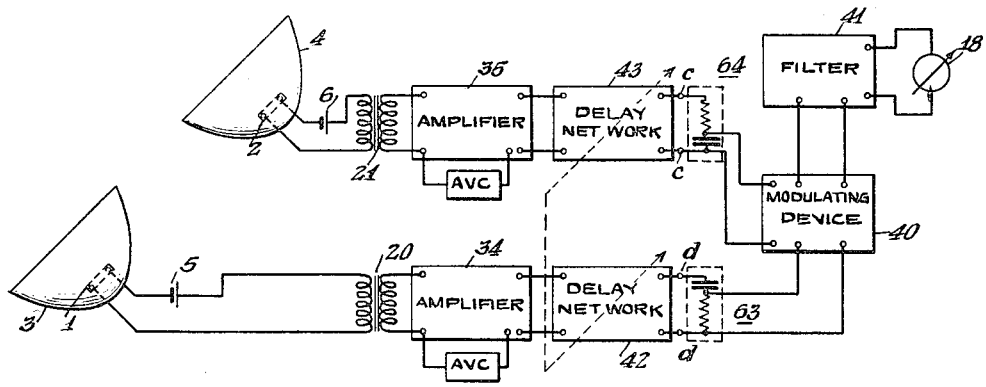
Figure 9:
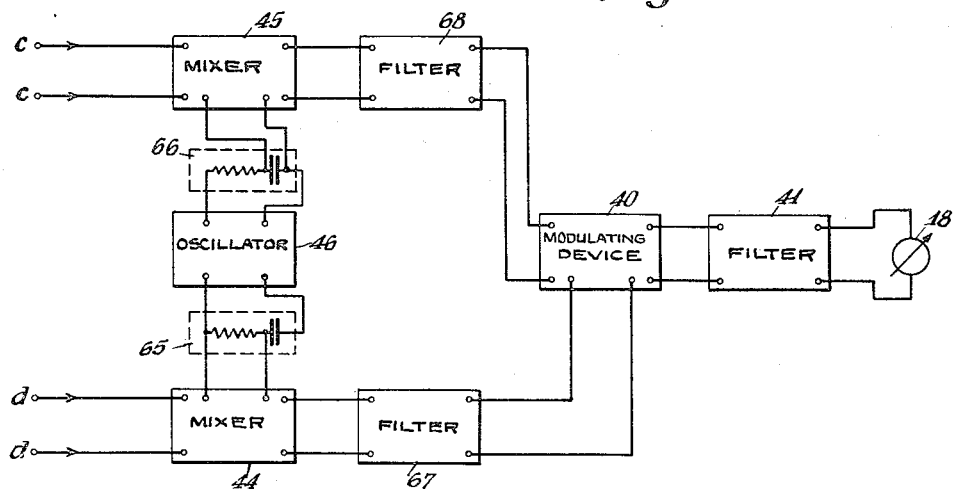

The above and further objects and advantages of the invention will become more apparent from the following detailed description taken with reference to the accompanying drawings, wherein Figure 1 is a diagram of a simple sound wave direction finding system illustrating the principle of the invention; Figure 2 shows a modification of a system of the type according to Figure 1; Figure 2a is a partial diagram illustrating a modification of Figure 2; Figure 3 shows a system similar to Figure 1 embodying amplifiers and other features to improve its operation; Figure 4 illustrates in block diagram form a modified sound direction finding system of the type according to Figure 2; Figures 5 and 6 are partial diagrams illustrating further modifications of Figure 4; Figures 7 and 8 are diagrams illustrating another modification of a direction finding system for sound waves of the type according to Figures 1 and 2, respectively; Figure 9 is a diagram illustrating a modification of Figure 8; Figure 10 shows a complete automatic direction finding system according to the invention; Figure 11 illustrates a sound wave direction finding system embodying a magnetic recording and reproducing device for varying the transmitting period or phases of the sounds received prior to comparing them in a common indicator or other translating device; Figure 12 shows a system for direction finding adapted to radio waves designed and operating in accordance with the principle of the invention.

Similar reference characters have been used to denote similar elements throughout the different views of the drawings.

As will be understood, the invention is applicable to the determination of the direction of sound waves of various characteristics, that is both ordinary plain sounds as well as sounds of a complex nature or sounds known as noise. Furthermore, while the invention is specifically described in connection with the determination of the direction of sound waves, it is understood that the novel system and method may be equally employed for determining the direction of radiant energy of a different character such as radio waves by the aid of spaced absorbers or the like producing like components derived from a single transmitting source shifted in phase relative to each other in dependence upon the direction or angle of incidence, and by combining and comparing the energy components received to derive a control potential varying in accordance with the phase difference of the received energy portions and serving to operate an indicating or receiving device in the manner described in detail hereinafter.

According to the novel method of the invention, the component sound waves or noises received by the spaced absorbers or pick-up devices are converted into corresponding electrical potentials in such a manner that the components of like frequency of the electric potentials have similar time phase positions as the corresponding components of like frequency of the sounds or noises received. The two potentials thus obtained are combined by mutual "modulation" to generate a control potential varying in accordance with the relative phase difference between the corresponding component frequencies of the two sounds or noises or the corresponding electrical potentials derived therefrom.

The novel method of the invention is accordingly referred to as "modulation" method to distinguish it from the binaural and interference methods known according to the prior art. As will be shown in the following the control potential obtained by mutual "modulation" of the sound potentials contains a component having a mean value which varies in accordance with the phase difference or difference in transmitting times of the sounds or noises received by the two absorbers.

This will be further understood from the following. Let it be assumed that the sounds or noise originally received comprise a spectrum of frequencies as represented by the following theoretical expression:

(I)　　$$\sum_{(n)} a_n \cos(\omega_n t - \varphi_n)$$

wherein $a_n$ represents the amplitude, $\omega_n$ represents the angular frequency and $\varphi_n$ the time phase position of the $n$th frequency component or harmonic of the sound or noise received. The latter is absorbed at different points in such a manner that the potentials to be compared which may be further retarded by additional delay devices as will be described hereafter will have total transmitting periods or time phases $\tau_1$ and $\tau_2$ which latter should be equal when the device is correctly adjusted. Due to the modulating action, a resultant is formed by ideal product formation from corresponding components of like frequency as follows (in addition to a constant factor which is of no interest here):

(II)　　$$\left[\sum_{(n)} a_n \cos\{\omega_n(t-\tau_1)-\varphi_n\}\right]$$
$$\left[\sum_{n} \cos\{\omega_n(t-\tau_2)-\varphi_n\}\right] = D + A$$

wherein D and A represent the direct current and alternating current terms of the resultant potential. The direct current component D resulting from the components of like frequencies of the two potentials being mutually modulated is found by detailed analysis as follows:

(III) $$D = \frac{1}{2}\sum_n a_n^2 \cos \omega_n(\tau_1 - \tau_2)$$

From the above it is seen that the value D becomes a maximum if the phases or transmitting times $\tau_1$ and $\tau_2$ are equal. Accordingly this method will be referred to hereinafter as "maximum modulation method" to distinguish it from the "minimum modulation method" to be described later. In a method of this character, secondary maxima may be obtained for certain differences of the total transmitting periods $\tau_1$ and $\tau_2$ depending on the character of the sounds or noises and provided that certain component frequencies are present in the sound or noise spectrum with considerable relative strength. It is to be noted however that such secondary maxima do not always have a similar character to those obtained according to the interference method and it is by no means necessary that to each secondary maximum according to the interference method there corresponds a maximum in the modulation method. It will be shown later how these secondary maxima may be avoided or their effect minimized by employing sound receivers having suitable directional and frequency response characteristics or by the use of special filter devices.

One of the main advantages of the modulation method is the fact that the effect upon the control potential by interfering noises or other undesirable sound sources is reduced to a minimum. Experience has shown that local disturbing noises affecting only one of the sound receivers exert no influence whatever upon the control potential, provided the latter is adequately steadied or smoothened by means of suitable filtering devices. On the other hand, it might be expected that disturbing noises originating from distant sound sources arriving laterally of the sound absorbers so far as they are received by the latter should produce an undesirable contribution to the control potential. Such disturbing noises, however, usually arrive with such a phase, exceeding in most cases 90°, that certain of the component frequencies according to Equation III will produce a positive contribution while other component frequencies will produce a negative contribution to the control potential. In consequence thereof, the resultant interfering potential will be small provided that the disturbing noises contain a sufficient number of component frequencies.

Referring to Figure 1 of the drawings, there is shown a simple direction finding system designed and constructed according to the invention. Items 1 and 2 represent a pair of sound pick-up devices such as ribbon microphones or the like mounted in suitable parabolic reflectors 3 and 4, respectively. The two microphones and reflectors are arranged with their lines of maximum receptivity parallel to each other and are spaced by a fixed distance $d$. In the example illustrated, they are rigidly connected such as by means of a rod 7 connecting the reflectors 3 and 4. The rod 7 is arranged for rotation around its center by means of a toothed wheel 8 carried by the rod and engaging a worm gear 9 which latter may be rotated by means of a hand-wheel 10 or any other mechanism. In this manner, the medial plane or line $m$—$m$ between the sound pick-up devices may be rotated until the direction A of an incoming sound wave or noise coincides with the medial plane and the differences $+\Delta s$ and $-\Delta s$ in transmitting time disappear as shown by the indicator to be described presently.

The microphones 1 and 2 have connected therewith electric circuits containing current sources such as batteries 5 and 6 and the primaries of a pair of transformers 12 and 16, respectively. In this manner electrical potentials are set up in the secondary circuits of the transformers each of which is an exact replica of the noise or sound variations received. These potentials are combined or mixed in a device or arrangement adapted to produce an output current varying according to the product of the instantaneous values of the applied input potentials. Such a combination or mixing of two potentials is known as "modulation" and it is understood that any of the known modulating devices or systems having suitable operating characteristics may be employed for the purpose of this invention. A characteristic of all these modulating devices is the fact that they have a non-linear current-voltage characteristic as distinct from devices or arrangements with a linear characteristic by which only a super-position of the potentials is obtained. The modulating circuit in the example illustrated is comprised of a Wheatstone bridge having two arms formed by both halves of the center tapped secondary of the transformer 16 and two further arms formed by the two halves of a center tapped ohmic resistance 15 each in series with rectifiers 13 and 14, respectively. The latter may be dry or contact rectifiers or of any other type having suitable characteristics so as to obtain a pure product in the output circuit of the instantaneous impressed input potentials without producing undesirable secondary combination frequencies giving rise to secondary maxima and minima in the bearing indication. The potential supplied by the microphone 2 is impressed between one pair of diagonal points of the bridge circuit through a transformer 12. In an arrangement of this type, provided rectifiers with suitable operating characteristics are employed, the product of the instantaneous potentials appears at the ends of the resistance 15 which product includes a direct current term varying in accordance with the phase difference or difference in transmitting time between components of equal frequency of the microphone potentials or in turn the sounds and noises received as explained above in detail. This current is indicated by a suitable direct current instrument or galvanometer shown at 18 after adequate filtering or smoothing by means of a low-pass filter of known construction shown at 17.

In carrying out the operation of a direction finder of the type described, all that is necessary is a searching manipulation by rotating the sound receivers by the aid of the hand-wheel 10 or the like until the current through the indicator 18 becomes a maximum in which case the center line between the receivers points in the direction of arrival of the sound waves or noises received.

In the arrangement according to Figure 1, the equality of the total transmitting periods of the noises or sounds is obtained by mechanically rotating the absorbers or pick-up devices as described. In accordance with an alternative method of the invention, the pick-up devices are arranged stationary and the equality of the time phases or transmitting periods established by adjusting suitable acoustic or electric retarding devices or filters inserted in either or both of the receiving channels. The advantages of such a system are obvious. They are primarily due to the fact that the absorbing devices may be arranged at a greater distance or basis $d$ which is no longer subject to mechanical limitations and results in a greater degree of accuracy of the bearing indication as is readily understood.

A system of this type is shown in Figure 2. In the latter the microphones 1 and 2 and associate reflectors 3 and 4 are fixedly mounted relative to each other. The potentials produced in the secondaries of the transformers 20 and 21 are impressed through suitable electric retarding networks or filters 22 and 23, respectively, upon the modulating system to produce a direct current control potential for operating an indicator similar as in the case of Figure 1. In the example illustrated the retarding networks comprise a plurality of inductance units shunted by capacities in the manner of a low-pass filter of well known construction. The inductance units or elements are provided with tap points arranged to cooperate with a movable contact in such a manner that the number of units connected between the input circuits and the modulating device may be varied in order to vary the delay or retardation of the potentials impressed thereon. As is understood, any other type of electrical delay network known in the electrical signaling arts may be employed for the purpose of the invention such as resistance delay networks wherein the inductance units of the networks 22 and 23 may consist of resistors or delay networks or filters known as criss-cross or tandem filters known per se by which a proportionate delay or retardation is obtained depending on the frequency of the applied input potentials or components thereof. It is possible to provide a single filter only or retarding device in one of the transmission paths which is adjusted to equalize the phases or transmitting periods of the control potentials impressed upon the modulating circuit. According to an alternative method shown in the drawings, retarding or delay networks are provided in both transmission paths arranged for differential adjustment by means of a common control such as indicated by the dotted line in such a manner that the retardation or delay in one circuit is increased and the retardation or delay in the other circuit is simultaneously decreased.

Under normal conditions, that is if the sounds arrive in a direction at right angle to the connecting line between the absorbers (medial plane) in which case the phases of the potentials are equal the variable contacts are exactly in the center so that equal delay or retardation is produced in both receiving channels. If the direction of the sound waves deviates from the above direction, the contacts are moved simultaneously, one to the left and one to the right, to establish phase equality of the potentials, the direction of movement of the contacts depending on whether the direction of the sound waves is to the left or the right of the medial line or plane between the sound absorbers. The potentials after passing the delay networks are impressed across a pair of transformers 24 and 25 upon a modulating circuit differing in the example illustrated from the circuit according to Figure 1 and commonly known as a ring modulation system. It is comprised of four rectifiers 30, 31, 32 and 33 forming a bridge circuit in the manner illustrated. One of the sound or noise potentials is impressed between one pair of diagonal points of the bridge through a transformer 26 and the other sound or noise potential is impressed between the remaining pair of diagonal points of the bridge through a transformer 27. The output circuit comprising the low-pass or smoothing filter 17 and indicating instrument 18 similar to Figure 1 is connected between the center tap points of the secondary windings of the transformers 26 and 27.

A filter or delay network of the type shown in Figure 2 has the advantage that the retardation produced increases in proportion to the frequency of the potentials applied. A filter of this type is therefore suited for the reception of complex sounds or noises comprising an extended range of frequencies such as a fundamental frequency of a large number of harmonics, whereby the retardation will be substantially proportional to the frequency and adjustment of corresponding frequencies to phase equality obtained by a single control.

If, on the other hand, the sounds received are of a less complex character, that is if the fundamental frequency substantially predominates over the remaining frequency components, delay devices of a more simple construction may be provided such as shown in the partial diagram according to Figure 2a. In the latter, the delay devices consist of series networks 28 and 29, respectively, each comprising a condenser and variable ohmic resistance in series. The latter are varied simultaneously by a common control element or knob in such a manner that the resistance of one delay network is increased while the resistance of the other delay network is decreased. The input potentials are impressed between the ends of the series networks while the output potentials of varied phase are derived from the ohmic resistances. In this manner the phases of the potentials impressed upon the modulator may be rotated in opposite directions and differentially adjusted to equal values in a manner substantially similar as in the case of Figure 2.

As pointed out, a modulating system should be used adapted to produce a control potential determined by the product of the instantaneous values of the impressed potentials. In other words, the modulating circuit should function so as to produce only sum and difference frequencies, the latter containing a direct current term supplying the control potential for operating the indicator as described above. Modulating devices or circuits which in addition to the first sum and difference frequencies produce further combination frequencies of higher order have the disadvantage that errors and false indications caused by secondary maxima in the bearing indication may be obtained.

From the above it is understood that any other of the known modulating devices or systems also known as mixers, having suitable characteristics and differing from those illustrated may be employed for carrying out the invention. A characteristic and advantage of the "modulation" method described by the invention is the fact that the control potential after sufficient steadying or smoothing and when using similar sound receivers varies substantially with the square of the amplitude of the sounds or noises received. As a result, comparatively small variations of the microphone potential will cause relatively large variations of the control potential which is equivalent of an improvement of the directional characteristics or directive sensitivity of the receivers.

On the other hand, owing to the inherent function of the "modulation" method, it is not necessary that both sound receivers have equal directional characteristics owing to the fact that only such sounds or noises will produce a direct current component in the output potential which are received simultaneously by both sound receivers. This essential difference compared with devices operating according to the interference method permits of the construction of apparatus by which a sharp directional effect of the total system is obtained by the aid of sound receivers having only a limited directivity or directional sensitivity. Thus, for instance, a sound receiver with limited directional characteristics may be employed for cooperation according to the "modulation" method with a sound receiver having a directional characteristic of desired sharpness in which case the resultant directional sensitivity will be equal to the directional sensitivity of the latter sound receiver.

In apparatus of the above described type with artificial retardation and receivers spaced at relatively great distances, special advantages are obtained by the use of receivers of limited directional characteristics due to a substantial simplification of the manipulation of the receivers. Thus, for instance, a single centrally located receiver of high directional characteristics may be provided associated with a retardation system and cooperating with one or more further receivers rigidly mounted at relatively great distances from the former.

In general, the microphone potentials or the potentials supplied at the output of the delay circuits are insufficient for operating the modulating device or circuit and the indicator connected thereto. An amplification of the sound potentials to a definite level is therefore required. The strength of the sound or other waves received varies within wide limits depending on the character of the radiation source, its distance and the conditions of propagation. Due to the above mentioned quadratic relation, it is advisable to provide means for adjusting the controlling or modulating potentials. This adjustment may be carried out manually by regulating the degree of amplification or gain of the amplifiers or the output current supplied by the amplifiers. A more favorable solution consists in the use of an automatic volume control hereinafter referred to as AVC in accordance with common usage by means of which the magnitude of the noise potentials obtained at the output of the amplifiers is maintained at a more or less constant value. Such AVC circuits are well known from the radio and amplifiers arts. In employing the same in connection with the invention, it is advisable to generate the AVC potential by means of a square law rectifier in view of the fact that the control potential obtained by the modulation of the sound potentials also varies with the square of the amplitudes of the signal intensity. By a suitable filtering or smoothing of the AVC potential obtained in this manner, it is possible to secure a relatively slowly acting automatic volume control thereby avoiding flattening of the amplitude variations caused by the searching movement by rotating the receivers which amplitude variations are of great assistance in the adjustment and manipulation of the device.

It is further to be noted that the amplitudes of the potentials to be mutually modulated have by no means to be equal so that the system does not require balanced amplifiers and/or receiving circuits. A certain difference between the potentials may even be advantageous depending on the type of modulation circuit used. Such difference can be easily obtained by adjusting the relative gain of the amplifiers.

In order to reduce interference by noises of short duration and extreme amplitude, such as gun shots and the like, it is advisable to limit the electrical potentials before their application to the modulation circuit to a predetermined value by means of limiting devices of known type such as dry rectifiers biased by a fixed potential or electron tubes with suitable curved operating characteristics.

In accordance with the nature of the "modulation" method described by the invention, the control potential depends to a large extent upon the character or spectral composition of the two sounds and noises to be compared. Thus, secondary maxima in the bearing indication may be produced to a more or less extent depending on the composition of the sounds and noises or other signals received. Such secondary maxima can be avoided by the use of sound receivers of high directional characteristics. Furthermore, a variation of the energy distribution in the sound or noise spectrum may be advantageous in eliminating the effect of secondary maxima. A strong relative increase of the low frequencies will result in widely separated secondary maxima the effect of which can be more easily avoided by the use of directional sound receivers. A relative increase of the high frequencies on the other hand greatly increases the accuracy and sensitivity of the bearing indication. In this connection it is to be noted that the higher frequencies are contained in the sounds and noises encountered in practice with such abundance that secondary maxima of appreciable strength are seldom to be expected.

Moreover, since the sounds or other signals to be compared may be devoid of certain frequencies which may have only limited amplitudes, and since certain frequency ranges may be immaterial for the bearing indication and are advantageously suppressed to eliminate interference, it is advisable according to a further feature of the invention to correct the sounds and noises received in a desired manner. This can be obtained by using properly designed sound receivers or amplifiers with the desired frequency response characteristics or by means of filters to be connected to and disconnected from the receiving circuits. It is not necessary to filter both sounds and noises equally, although this is advisable in the interest of interference elimination especially in the case that the modulation circuit does not function in an ideal manner and that combination frequencies of a higher order are produced. It is advisable, however, in any case to suppress the unnecessary extremely high frequencies to eliminate the microphone and amplifier noises. A temporary suppression of the high frequencies or relative increase of the low frequencies may be advisable during the searching while after a sound or other signal source has been identified a suppression of the lower frequency may be advisable to increase the accuracy and sensitivity of the direction indication. For this purpose provision may be made for a "searching" and "operating" condition by connecting and disconnecting a filter of suitable construction.

It is substantially immaterial at what stage the phase of the separate frequency components of the sounds or other signals is changed or rotated. It is only essential in accordance with the nature of the "modulation" method that the components of like frequency of the signals are rotated or shifted by substantially equal amounts. If this is not the case for certain frequencies, phase shifting or retardation circuits dependent on frequency may be provided such as described in connection with Figure 2.

Referring to Figure 3 of the drawings, there is shown a system similar to Figure 1, but embodying amplifiers and filter devices of the type hereinbefore described. The amplifiers shown by rectangles 34 and 35 are connected to the secondaries of the input transformers 20 and 21 and equipped with AVC as indicated diagrammatically in the drawings. The filters 36 and 37 also shown in diagrammatic form may be of standard construction and serve for modifying the relative strength of the components in the sound or noise spectrum for the purpose described hereinabove. The modulating device 40 may be of the same type as described in Figures 1 and 2 or of any other type known, while the filter 41 corresponds to filter 17 in Figures 1 and 2, and 18 represents the indicator similar as in previous figures. There are further shown a pair of alternating current indicators 38 and 39 connected between the filters 36 and 37 and the modulating device 40 and serving to indicate the relatively large variations of the magnitude of the signal potentials during the searching operation when rotating the sound receivers by means of the hand-wheel 10. These indicators greatly assist the manipulation and adjustment of the device. Likewise in place of the manual manipulation of the receivers by the control 10 as shown in this figure, delay networks may be inserted before or after each of the amplifiers of the type 22 and 23 shown in connection with Figure 2 or other equivalent type so as to obtain phase or delay changes in either receiving circuit without changing direction of pick-up receivers which has been thoroughly described above.

In accordance with the method described hereinbefore, the component frequencies of the potentials impressed upon the modulating circuit are equal to the corresponding frequencies of the coordinated sound or noise components. This however need not be the case and the following analysis will show that a difference in frequency may exist between the components of the sounds and noises and the corresponding components of the potentials derived therefrom impressed upon the modulator circuit. It is only essential that the relative phase differences between the corresponding components are retained.

In order to illustrate this point more clearly, let it be assumed that to each sound or noise component having an angular frequency $\omega_n$ and time phase position $\varphi_n$ there corresponds a potential to be compared by modulation with a changed frequency $\omega_n + \Omega_n$ and time phases $\varphi_n + \psi_{n1}$ or $\varphi_n + \psi_{n2}$, and eventually having a different amplitude $a'_{n1}$ or $a'_{n2}$, respectively. Thus, the two potentials may be represented by the following expressions:

$$\text{(IV)} \quad \sum_{(n)} a'_{n1} \cos\left[(\omega_n + \Omega_n)t - \omega_n \tau_1 - \varphi_n - \psi_{n1}\right]$$

$$\sum_{(n)} a'_{n2} \cos\left[(\omega_n + \Omega_n)t - \omega_n \tau_2 - \varphi_n - \psi_{n2}\right]$$

From the above the direct current component of the control potential is obtained as follows:

$$\text{(V)} \quad D = \frac{1}{2} \sum_n a'_{n1} a'_{n2} \cos\left[\omega_n(\tau_1 - \tau_2) + \psi_{n1} - \psi_{n2}\right]$$

If in accordance with the above phase condition the phase differentials are equal for all components of like frequency, that is if $\psi_{n1} = \psi_{n2}$, the direct current term of the control potential will be as follows:

$$\text{(VI)} \quad D = \frac{1}{2} \sum_n a'_{n1} a'_{n2} \cos\left[\omega_n(\tau_1 - \tau_2)\right]$$

which is identical to Equation III. Although the frequency differential may be different for different frequencies, in most practical circuits the change will be by a constant frequency range or by two simultaneous frequency ranges.

Such a frequency transformation or transposition may be obtained by the modulation of a carrier wave similar as in the known superheterodyne receiving system and segregation of one side band from the modulation product. A system of this type is diagrammatically illustrated in Figure 4. The latter comprises the microphones 1 and 2, input transformers 20 and 21, amplifiers 24 and 25 and delay networks 42 and 43, respectively, which latter may be of the type as shown at 22 and 23 or 28 and 29 in Figures 2 and 2a. The potentials supplied by the networks 42 and 43 are impressed upon mixing or modulating devices or circuits 44 and 45, respectively, which latter may be of the type of the mixing circuits shown in Figures 1 and 2 comprising rectifier arrangements or may be of any other suitable construction such as electron mixer tubes, also known as pentagrid converters. There is further shown an oscillator 46 of any suitable construction serving to generate a carrier wave which may be of medium or high frequency, components of which are impressed upon the mixers 44 and 45. In this manner a pair of modulated carrier waves are obtained which are applied to suitable band pass filters 47 and 48, respectively, for segregating either the upper or lower side bands. The latter which comprise frequencies differing from each other by the same relative phases as the original sound or noise frequencies are combined in the modulating device 40 to produce a steady control potential in the output meter 18 after suitable filtering by means of a low pass filter 41 in a manner substantially similar as described in the previous figures. The mixing with the carrier wave may also be effected in the sound receivers such as by using condenser microphones biased by a potential varying at carrier frequency in place of a constant or steady bias. In the latter case, it is advisable, however, to make provision for suppressing the carrier wave which appears with a large amplitude prior to the modulation. In this case, the mixing devices 44 and 45 may be dispensed with. In most cases also the filters 47 and 48 may be omitted.

An advantage of the carrier wave modulation or shifting of the signal frequencies consists in a reduced relative band width of the potentials to be compared. This in turn enables an amplification without distortion prior to their mutual modulation. Another advantage is the fact that a plurality of carrier waves modulated in accordance with different sound potentials may be amplified by common amplifiers and serve to indicate the direction of incoming waves in both azimuthal and zenithal planes.

The indicator 18 may be a direct current instrument such as a galvanometer as described or a cathode ray indicator or any other suitable indicating device of known construction. In place of an indicator, a suitable control device such as polarized relay may be provided serving to control automatically the operation of the sound receivers as will be described hereafter in connection with Figure 10. In both the manual and automatic indication of the direction of the sound waves, it may be advisable to employ an indicating device with a non-linear characteristic such as an instrument with a lower crowded scale portion to reduce the effect of disturbing potentials, or an instrument with a crowded higher scale portion in view of the quadratic relation of the control output potential. It may be further advisable to indicate the alternating current component contained in the control potential in an effort to facilitate the searching operation and manipulation of the system. This can be obtained by the provision of a further instrument 52 of suitable characteristics such as shown in the partial diagram according to Figure 5 showing only the parts following the output terminals $a$, $a$ and $b$, $b$ of the filters 47 and 48. A high pass filter 50 which may consist of a condenser serves to prevent the direct current component from affecting the meter 52. The deflection of the latter is independent of the difference between the transmitting periods or phases and is determined primarily by the directional characteristics of the sound receivers. In contrast thereto the indicator 18 indicates a pronounced maximum if the transmitting periods or phases are alike. From the differences of the deflections of the two meters, therefore, it is possible to draw a direct conclusion on the transmitting periods or phases of the potentials derived from the sounds or noises or other signals in the two receivers. In the presence of strong disturbing noises the strength of the interfering potentials may be gathered from both indications. In order to further facilitate the operation additional alternating current instruments 38 and 39 as shown in Figure 3 may be provided.

In Figure 6 there is shown a further modification wherein a second controlling potential produced in a demodulator 55 derived from one of the signal potentials and applied to an indicator 59 through a smoothing filter 57. On account of the similarity of the devices 40 and 55, the filters 41 and 57 and the meters 18 and 59, the indications of the latter will be equal if the potentials impressed upon 40 coincide, that is to say, if the difference between the transmitting periods disappears in case of equal amplitudes of the signal potentials. With increasing differences of the transmitting periods the deflection of the meter 18 will decrease while the deflection of the meter 59 will decrease only after considerable displacement of the receivers due to the directional characteristics of the latter. The potential difference corresponding to the difference in transmitting periods is preferably read by a further indicator 66 connected between the indicators 18 and 59 whose indication will be zero if the difference between the transmitting periods is zero and whose deflection increases in either direction if the difference between the transmitting periods or phases increases towards positive or negative values.

While it is possible by the employment of the above described "maximum modulation method" according to the invention to effect a simple and easy direction finding or bearing indication free from the drawbacks and inconveniences of the methods known in the prior art, the fact that the method described works on the maximum renders the indication relatively inaccurate like all methods employing the maximum as an indication due to the fact that the control potential varies only slightly in the neighborhood of the maximum deflection as a result of small differences between the transmitting periods or phases of the sounds or noises received. Furthermore, it is difficult to ascertain whether the difference in phase or transmitting time is positive or negative.

The above difficulty is overcome by a further modification of the invention described in the following. According to this improved method, the potentials of like frequency derived from the sound or noise components are shifted in phase by 90° relative to each other, whereby the direct current component in the control potential after modulation becomes zero if the transmitting periods of the sounds and noises are equal and assumes positive or negative values if the transmitting time of one sound component increases or decreases relative to the transmitting time of the other sound component. This method is accordingly referred to as "minimum modulation method."

The function of this method will be further understood from the following. Let it be assumed that the sounds or noises have total transmitting periods $\tau_1$ and $\tau_2$ at the instant of arriving at the sound receivers or after additional retardation by special artificial delay devices. It is further assumed that $a_{n1}$ and $a_{n2}$ represent the amplitudes, $\omega_n$ the angular frequency, and $\varphi_n$ the original phase of two sound or signal components of like frequency. The latter are therefore represented by the following theoretical expressions:

(VII) $\quad \sum_{(n)} a_{n1} \cos [\omega_n(t-\tau_1) - \varphi_n]$ and $\quad \sum_{(n)} a_{n2} \cos [\omega_n(t-\tau_2) - \varphi_n]$ From these sound components corresponding electric potentials are produced in which the components of like frequency may have different amplitudes $a'_{n1}$ and $a'_{n2}$, and whose frequency may be shifted by an amount $\Omega_n$ and which have phases changed by values $\psi_{n1}$ and $\psi_{n2}$, respectively. These potentials which are to be mutually modulated are represented by the following expressions:

(VIII) $\sum_{(n)} a'_{n1} \cos [(\omega_n + \Omega_n)t - \omega_n \tau_1 - \varphi_n - \psi_{n1}]$ (IX) $\sum_{(n)} a'_{n2} \cos [(\omega_n + \Omega_n)t - \omega_n \tau_2 - \varphi_n - \psi_{n2}]$ By a mutual modulation of these potentials a resultant control potential is formed having a direct current term (derived from the potential components of like frequency) which is found as follows:

(X) $G = \frac{1}{2} \sum_{(n)} a'_{n1} a'_{n2} \cos [\omega_n(\tau_1 - \tau_2) + \psi_{n1} - \psi_{n2}]$ In accordance with the above condition $$\psi_{n1} - \psi_{n2} = \pm \frac{\pi}{2}$$

resulting in a direct current term or control potential as follows:

(XI) $\quad G = \mp \tfrac{1}{2} \sum_{(n)} a'_{n1} a'_{n2} \sin[\omega_n(\tau_1 - \tau_2)]$ From the above it is seen that the direct current component becomes zero if the transmitting periods $\tau_1$ and $\tau_2$ are equal and assumes positive or negative value with relatively small differences between the transmitting periods.

As pointed out above, the corresponding components of the potentials derived from the sounds and noises may have different frequencies and amplitudes. In a simple case as encountered in practice where the frequencies of the corresponding components are alike, the frequency shift of the potentials can be obtained by linear transmitting systems. Thus, one of the potentials may be derived as an exact replica of one of the sound components while the other potential is obtained by a suitable phase shifting network so as to fulfill the above phase requirement.

A simple arrangement of the latter type is shown in Figure 7 and Figure 8 which differ only by the provision of manually rotatable sound receivers and electrical phase rotation, respectively, similar to Figures 1 and 2. According to Figures 7 and 8, the output of the amplifiers 34 and 35 are impressed upon phase shifting networks 63 and 64 comprising in the example illustrated a condenser and an ohmic impedance in series. The modulating potentials impressed upon the modulating device 40 are derived from the ohmic impedance of the phase shifting network in one receiving channel and from the condenser of the phase shifting network in the other receiving channel, respectively, in such a manner that both potentials are at a 90° phase difference, whereby the output control current for operating the indicator 18 is zero if the transmitting periods of the sounds or noises are equal as explained above. In the example illustrated two phase shifting networks 63 and 64 are provided, one in each channel. In this case the condenser in each phase shifting network is designed in such a manner that its capacitative reactance for the average frequency is equal to the ohmic impedance in series therewith, whereby the potential derived from one of the networks leads the potential impressed thereupon by 45° and the potential derived from the other network lags the potential impressed thereupon, that is to say the corresponding potentials impressed upon the modulating device 40 differ relatively by 90° phase angle. Alternatively, only a single phase shifting network of the type shown may be provided in one of the channels, in the example illustrated network 63 in the lower channel, in which case the ohmic impedance is chosen to be large relative to the reactive impedance of the condenser in series therewith, whereby the potential drop across the latter has a 90° phase difference relative to the potential impressed upon the series network. This quadrature phase shift for all practical purposes is equal for an extended band of frequencies such as sounds, noises or a radio frequency signal band. Such an arrangement is shown in Figure 11.

It is also possible to apply this "modulation minimum method" to a system employing a local carrier modulation as described in connection with Figure 4. In the latter case preferably the carrier components modulated by the receiving sound or noise potentials are at 90° phase difference whereby an equal phase shift is obtained for all the side frequencies corresponding to the components of the sounds and noises received comprising one of the modulation side bands segregated by filters 67 and 68 and impressed upon the modulating device 40. For this purpose the oscillations produced by a local oscillator 46 are impressed upon a pair of phase shifting networks 65 and 66 each comprising an ohmic impedance and a condenser in series as shown in the partial diagram according to Figure 9. One of the carrier components is derived from the ohmic impedance of one phase shifting device and the other carrier component is derived from the terminals of the condenser of the other phase shifting device. If the value of the ohmic impedance of the phase shifting devices is chosen to be equal to the capacitative reactance of the condenser in series therewith for the oscillator frequency, the potential derived from one of these devices will lead by 45° the oscillator current while the potential derived from the other phase shifting device will lag the oscillator current by 45°, that is to say, the carrier components impressed upon the mixing devices 44 and 45 and in turn the corresponding side frequencies of the modulated output potentials will have phase differences of exactly 90°.

The same effect may be obtained without special mixing devices 44 and 45 by using condenser microphones as sound receivers biased by potentials varying at carrier frequency and having a phase difference of 90° in place of steady bias potentials.

As pointed out before, the control potential may serve for operating an automatic mechanism for direct indication of the direction of arrival of the sound waves received. Such a complete automatic system is shown in Figure 10. In the latter, the two receiving channels comprising the microphones, input transformers 20 and 21, amplifiers 34 and 35 are identical to the previous figures. The output of the amplifiers 34 and 35 are impressed through transformers 70 and 71 upon a pair of modulating devices 72 and 73 each comprising four rectifiers in a ring modulation arrangement. There are further impressed upon the modulators 72 and 73 a pair of carrier wave components derived from an oscillator 46 and having a relative phase difference of 90° obtained by phase rotating networks 76 and 77 in a manner similar as described in Figure 9. Items 78 and 79 are filters for segregating one of the side bands of the modulated potentials which latter are impressed through transformers 80 and 81 upon a further modulating system 82 to produce a steady control potential applied to an indicator 18 and to a differential relay 85 through a smoothing or steadying filter 83. In the normal position, that is when the sound waves arrive in the direction of the medial line between the sound receivers, the control potential applied to the relay 85 is zero whereby the armature of the latter assumes a neutral position. If the direction of the sound waves deviates slightly from the medial direction between the absorbers the armature of the relay will move in either direction thereby closing a contact and applying a negative or positive potential supplied by suitable sources 86 and 87 to a servo-motor 88 operating the worm 9 and rotating the sound receivers, until the output potential has again become zero and the armature of the differential relay returned to its neutral position thereby stopping the motor 88. In this manner, the sound receivers will be automatically rotated until the medial line therebetween coincides with the direction of arrival of the sound waves or noise received thus affording an automatic indication or continuous following of the sound receivers when receiving sounds or noises from a movable source such as the propeller or motor noise of an aeroplane.

The control mechanism for operating the sound receivers or variable delay devices by the aid of a servo-motor or the like may be of any other of the numerous types known in the art as is readily understood. Thus in place of a mechanical relay controlled by the output potential of the modulating device a control circuit comprising an electronic relay or amplifying tube may be provided which in turn controls a suitable adjusting device for the sound receivers or variable electric or acoustic delay devices.

In Figure 11 there is shown a direction finding system for sound waves employing a combined recording and reproducing device as a variable delay element in addition to other improved features. The sound waves emanating from a source such as an aeroplane Q are received by the two microphones 1 and 2 and the potentials generated by the latter impressed upon the input circuits of a pair of amplifiers 90 and 91. The latter in the example shown comprise a pair of resistance coupled amplifying tubes 92 and 93 (shown for amplifier 91 only) and an automatic volume control system 94 and 95, respectively. The latter includes a diode rectifier 96 connected to the output of the amplifier and a smoothing filter 97 whereby a constant control potential is generated impressed upon the control grid of the input tube 92 which is preferably of the remote cut-off type especially suited for this purpose. In this manner, the gain of the amplifiers is automatically regulated in such a manner that the amplified output potentials remain substantially constant independently of the signal strength which latter varies with the distance and strength of the source Q of the sounds or noise received. The output potentials supplied by the amplifiers 90 and 91 are impressed upon variable delay or phase shifting systems 98 and 99. The delay system 98 in the example illustrated comprises an endless tape or wire of magnetic material moved at a constant speed around a pair of rollers or the like as indicated. Items 102 and 103 represent recording and pick-up magnets having windings connected with the input and output circuits, respectively. In this manner the currents impressed from the output of the amplifier upon the winding of magnet 102 are recorded upon the steel tape or wire 100 and corresponding electric potential variations produced in the winding of the magnet 103 with a definite time differential therebetween as determined by the distance 1 between the recording and reproducing magnets. Item 104 represents a quenching magnet energized by a constant source such as a battery in order to demagnetize the tape or wire 100 after passing the reproducing magnet 103. Similarly, the delay device 99 comprises a steel wire or tape 101, recording magnet 105, reproducing magnet 106, and quenching magnet 107. In the example illustrated, the magnets 102 and 103 of one delay device and 105 and 106 of the other delay device are shown in their normal position and may be displaced in opposite directions as indicated by the arrows thereby to obtain differential adjustment of the relative phases or transmitting periods of the sound or noise signals impressed upon the delay systems. After passing the delay systems, the noise or sound signals are further amplified by means of amplifiers 111 and 112 comprising amplifying tubes 113 and 114, respectively. The amplified potentials are impressed upon a modulating arrangement 115 through transformers 116 and 117. The modulating arrangement in the example illustrated comprises a ring modulating circuit consisting of four rectifiers 118, 119, 120 and 121 with an output filter 122 and indicator 123 connected thereto in substantially the same manner as shown in Figure 2. In the example illustrated there is further shown a phase shift network 110 inserted in one of the receiving channels to effect a constant phase shift of 90° of the potentials in this channel with a view to obtain a "minimum modulation" indication in a manner as previously described.

Referring to Figure 12 there is shown a system according to the invention as applied to the reception of radio waves. Items 125 and 126 represent a pair of di-pole antennae connected to amplifiers 127 and 128. The output of the amplifiers are connected to a pair of two wire-systems 130 and 131 bridged by impedances 132 and 133, respectively, at their opposite ends. In this manner waves are produced along the two-wire systems 130 and 131 from which potentials of varying phase relation are tapped off by pairs of slidable contacts 132' and 133'. These potentials are impressed upon mixers 134 and 135. To the latter there are further applied a pair of carrier wave components having a 90° phase difference produced by an oscillator 129 and a phase shifting network comprising a condenser 136 and an ohmic impedance 137 in series as is readily understood from the above. The modulated carrier wave components obtained in this manner are passed through filters 138 and 139 and impressed upon a modulating system 140 consisting in the example of a pair of diodes 141 and 142 connected in opposition and across the secondary of a transformer 144 in one of the receiving channels. The secondary of the transformer 143 in the other receiving channel is connected across the common cathode of the diodes and the center tap of the secondary of the transformer 144. A pair of load resistors 145 and 146 are connected to the anodes of the diodes whereby the sum of the potentials appears at one of these load resistors and the difference of the potentials at the other load resistor. The latter are connected to a low pass filter 147 which in turn serves to supply the indicator 148 corresponding to the indicator 18 in the previous figures. As is understood, this system may be modified in accordance with any one of the arrangements heretofore described such as by the provision of a 90° phase shift system to obtain a "minimum modulation" indication and to produce an automatic adjustment by rotating the antennae system about a central point or by automatic regulation of the variable phase shift arrangement or sliding contacts 132' and 133'.

It is further understood from the above that special variable phase shift devices may be omitted in a system of the type described and the indicator calibrated directly in degrees of phase differences or directions either according to the "maximum modulation" or the "minimum modulation" methods as described. Furthermore, instead of di-pole antennae, loop antennae or the like may be provided and a system adapted for reception of longer wave length in which latter case the phase shift may be effected by variable delay networks of the type shown in Figure 2.

It will be evident from the above that the invention is not limited to the specific methods and systems disclosed and described herein for illustration but that the novel combination and inventive concept are susceptible of numerous variations and modifications coming within the broad scope and spirit of the invention as defined in the appended claims. The specification and drawings are accordingly intended to be regarded in an illustrative rather than a limiting sense.

I claim:

1. A direction finding system comprising a pair of spaced radiant energy absorbers, means for producing equivalent electric current waves varying according to the energy portions received by said absorbers from a single transmitting source, modulating means for producing a resultant potential being a product function of the instantaneous values of said current waves, a direct current instrument responsive to the direct component of said resultant potential connected to said modulating means, and means for simultaneously varying by substantially equal amounts the relative time phases of components of like frequencies of said current waves.

2. A direction finding system as claimed in claim 1, wherein said last means is comprised of an arrangement for rotating said absorbers about a pivot point.

3. A direction finding system as claimed in claim 3, wherein said absorbers are arranged fixedly relative to each other, and said last means is comprised of an aperiodic delay means for retarding the time phases of the components of at least one of said current waves prior to their application to said modulating means.

4. A direction finding system comprising a pair of spaced radiant energy absorbers, means for producing a pair of equivalent electric current waves varying according to the energy portions received by said absorbers from a single transmitting source, a modulating device controlled by said current waves and adapted to produce an output potential being a product function of the instantaneous values of the applied input potentials, a pair of electric delay networks adapted to effect a substantially constant time phase delay for all component frequencies of said current waves, a common operating element for said networks for adjusting the relative time phases of corresponding components of like frequencies of said currents prior to their impression upon said modulating device, and a translating device responsive to the direct component of said output potential connected to said modulating device.

5. A direction finding system comprising a pair of spaced radiant energy absorbers, means for producing a pair of electric current waves varying in accordance with the energy portions received by said absorbers from a single transmitting source, whereby corresponding components of like frequencies of said current waves have equal relative phase relation to the corresponding component frequencies of the energies received, a carrier wave oscillator, means for modulating separate carrier components derived from said oscillator each in accordance with one of said current waves, a modulating device controlled by the modulated carrier wave components and adapted to produce an output potential being the product function of the instantaneous values of the applied input potentials, adjustable time delay means adapted to effect a substantially constant relative time phase displacement for all frequency components of said current waves, and a translating device responsive to the direct current component of said output potential connected to said modulating device.

6. A direction finding system comprising a pair of spaced radiant energy absorbers, means for producing a pair of electric current waves varying in accordance with the energy portions received by said absorbers from a single transmitting source, whereby corresponding components of like frequency of said current waves have equal relative phase relation to corresponding frequency components of the energies received, means for producing a quadrature phase-shift between all corresponding components of like frequency of said current waves, further means for mutually modulating said current waves to derive therefrom a resultant potential including a direct component varying in accordance with deviations from said quadrature relation between corresponding components of like frequency of said current waves, and a translating device responsive to said direct component connected to said last means.

7. A direction finding system comprising a pair of radiant energy absorbers, means for producing a pair of equivalent electric current waves varying in accordance with the energies received by said absorbers from a single transmitting source, whereby corresponding components of said current waves have a relative time-phase relation depending on the direction of arrival of said radiant energy, a carrier wave oscillator, means for deriving from said oscillator a pair of carrier-wave components having a 90° phase relation, means for modulating each of said carrier-wave components in accordance with one of said current waves, further means for mutually modulating corresponding side-bands of the modulated carrier-wave components to derive therefrom a resultant potential including a direct component varying in accordance with the relative phase relation of components of like frequencies of said current waves, and a translating device responsive to said direct component connected to said last means.

8. A direction finding system comprising a pair of spaced radiant energy absorbers, means for producing a pair of equivalent electric current waves varying in accordance with the energies received by said absorbers from a single transmitting source, a pair of amplifiers for amplifying said current waves, automatic volume control means for maintaining the output of said amplifier substantially constant independently of variations of the strength of the energies received, modulating means for producing a resultant potential from the amplified current waves being a product function of the instantaneous values of the amplified current waves, a translating device responsive to the direct component of said resultant potential connected to said modulating means, and means for substantially equally adjusting the relative time phases between components of like frequencies of said current waves.

9. A direction finding system comprising a pair of spaced radiant energy absorbers, means for producing a pair of equivalent electric current waves varying in accordance with the energies received by said absorbers from a single transmitting source, a pair of amplifiers for amplifying said current waves, automatic volume control means for maintaining the output of said amplifiers substantially constant independently of variations of the strength of the energies received, a variable electric delay network in at least one of said amplifying channels for substantially equally varying the relative time phases between components of like frequency of the amplified current waves, a modulating device for producing a resultant potential from the amplified and delayed current waves being a product function of the instantaneous values of said current waves, and a translating device responsive to the direct component of said resultant potential connected to said modulating device.

10. A direction finding system comprising a pair of spaced radiant energy absorbers, means for producing a pair of equivalent electric current waves varying in accordance with the energies received by said absorbers from a single transmitting source, a pair of amplifiers for amplifying said current waves, automatic volume control means for maintaining the output of said amplifiers substantially constant independently of variations of the strength of the received energies, means for effecting a constant 90° phase-shift between corresponding components of like frequency of said current waves, variable time delay means for substantially equally varying the relative time phases between components of like frequency of said current waves, a modulating device for producing a resultant potential being a product function of the instantaneous values of the amplified and delayed current waves, a translating device responsive to the direct component of said resultant potential connected to said modulating device.

11. A direction finding system for sound waves comprising a pair of microphone pick-up devices spaced by a pre-determined distance, separate receiving channels including amplifiers comprising automatic volume control means for amplifying the currents produced by said pick-up devices to substantially equal values independently of the strength of the sounds received from a single transmitting source, a variable electric delay network associated with at least one of the receiving channels for substantially equally varying the relative time phases of components of like frequency of the amplified currents, a modulating device adapted to produce an output potential being a product function of the instantaneous values of a pair of impressed input potentials, means for impressing output potential from said amplifiers upon said modulating device, and a translating device responsive to the direct component of the output potential of said modulating device.

12. A direction finding system for sound waves comprising a pair of microphone pick-up devices spaced by a pre-determined distance, separate receiving channels including amplifiers comprising automatic volume control means for increasing the microphone currents to substantially constant values independently of the strength of the sounds received from a single transmitting source, means for effecting a 90° phase-shift between corresponding components of like frequency of the amplified currents, variable time delay means for substantially equally varying the relative time phases of components of like frequencies of the amplified currents, a modulating device adapted to produce a resultant output potential being a product function of the instantaneous values of a pair of impressed input potentials, means for impressing output potential from said amplifiers upon said modulating device, and a translating device responsive to the direct component of the output potential of said modulating means.

13. A direction-finding system for sound waves comprising a pair of microphone pick-up devices spaced at a pre-determined distance, a pair of amplifiers comprising automatic volume control means for amplifying the microphone currents to substantially constant values independently of the strength of the sounds received from a single transmitting source, a modulating device adapted to produce an output potential being a product function of the instantaneous values of a pair of input potentials impressed thereupon, means for impressing output potential from said amplifiers upon said modulating device, a translating device responsive to the direct component of the output potential of said modulating means, and means for rotating said pick-up devices about a central pivot point.

14. A direction finding system for sound waves comprising a pair of microphone pick-up devices spaced at a pre-determined distance, a pair of amplifiers comprising automatic volume control means for amplifying the microphone currents to substantially equal values independently of the strength of the sounds received from a single transmitting source, means for effecting a 90° phase shift between components of like frequency of the amplified currents, a modulating device adapted to produce a resultant output potential being a product function of the instantaneous values of a pair of impressed input potentials, means for impressing output potential from said amplifiers upon said modulating device, relay means controlled by the direct component of said resultant potential connected to said modulating device, and further means governed by said relay means for rotating said pick-up devices about a central pivot until said direct current potential assumes a minimum value.

15. A radio direction finding system comprising a pair of spaced antennae, means including automatic volume control means for amplifying the currents received by said antennae to substantially constant values independently of the signal strength, aperiodic means for variably adjusting the time phase of at least one of the amplified currents, a modulating device adapted to produce a resultant output potential being a product function of the instantaneous values of a pair of impressed input potentials, means for impressing output potential from said amplifiers upon said modulating device, and an indicator responsive to the direct component of the output potential of said modulating device.

GUSTAVE GUANELLA.